United States Patent

[11] 3,615,323

| [72] | Inventors | Johannes Cornelissen;<br>Arnoldus Martinus Marie DeRijk, both of<br>Emmasingel, Eindhoven, Netherlands |
|---|---|---|
| [21] | Appl. No. | 803,930 |
| [22] | Filed | Mar. 3, 1969 |
| [45] | Patented | Oct. 26, 1971 |
| [73] | Assignee | U.S. Philips Corporation<br>New York, N.Y. |
| [32] | Priority | Mar. 7, 1968 |
| [33] | | Netherlands |
| [31] | | 6803210 |

[54] METHOD OF INCREASING THE MECHANICAL STRENGTH OF GLASS ARTICLES
2 Claims, No Drawings

[52] U.S. Cl. ................................................ 65/30,
65/33, 65/114, 117/124
[51] Int. Cl. ........................................................ C03c 21/00
[50] Field of Search .......................................... 65/30, 33,
114; 117/124

[56] References Cited
UNITED STATES PATENTS
2,779,136  1/1957  Hood et al. ................... 65/30 X
FOREIGN PATENTS
863,570  3/1961  Great Britain ................ 65/30
1,051,792  12/1966  Great Britain ................ 65/30

*Primary Examiner*—S. Leon Bashore
*Assistant Examiner*—John H. Harman
*Attorney*—Frank R. Trifari ABSTRACT: A method of strengthening glass articles consisting essentially of an alkali-aluminosilicate glass by contacting the glass article while above the annealing point but below the softening point of the glass with a melt containing lithium ions and about 0.005 to 0.1 gram-ion per bath of silver ions to exchange $Na^+$ ions against $Li^+$ ions.

METHOD OF INCREASING THE MECHANICAL STRENGTH OF GLASS ARTICLES

THe invention relates to a method of increasing the mechanical strength of glass articles and to articles thus strengthened.

A similar method is known from U.S. Pat. No. 2,779,136 according to which an article which consists of glass which contains 45–50% $SiO_2$ and 7–25% $K_2O$ and/or $Na_2O$, is contacted, above the annealing point of the glass but below the softening point thereof, with a melted lithium salt and kept in contact with it for such a period of time that a considerable quantity of alkali ions in a surface layer are exchanged against lithium ions. Since the resulting glass has a lower coefficient of expansion than the original glass, a compressive stress is built up in this surface layer which results in an increased strength with respect to load under tensile stress, even after rigorous damage of the surface.

The annealing point is to be understood to mean herein that temperature at which the viscosity of the glass is $10^{14.6}$ poises, and the softening point is to be understood the temperature at which the viscosity is $10^{7.6\ poises}$.

However, the increase in strength generally is rather moderate; the average bending strength, after standard damage by grazing, is approximately 15 kgms./sq.mm. A considerably higher strength (approximately 4–50 kgms./sq.mm.) can be obtained by adding approximately 10% of titanium dioxide to an aluminum oxide-containing mixture of starting materials. As a result of this a finely-dispersed precipitate of $\beta$-spodimene is formed in the surface layer in question after diffusion of lithium ions, which precipitate has the composition $Li_2O.Al_2bh3.4SiO_2$ and even has a negative coefficient of thermal expansion. A drawback of this variation is that the $TiO_2$-containing starting glasses technically are not very attractive. Notably they are rather hard which means that the softening point lies comparatively high.

According to Dutch patent application 6,703,015, the content of which was published in Compte Rendu du Symposium sur la surface du verre et ses traitements modernes du 6-9 June, 1967, at Luxemburg, there exists a very narrow restricted range of compositions in the system $Li_2O/Na_2O_3 -Al_2O_{Al}-SiO_2$ to which high strength values (approximately 50 kgms./sq.mm.) can be given by the said exchange of $Na^+$-ions against $Li^+$-ions, when the melted salt bath which contains lithium ions also contains silver ions in a quantity between approximately 0.005 and 0.1 gm. ion per bath.

The composition of the glass which can thus be strengthened must lie within one of two adjoining regions of compositions in percent by weight:

$SiO_2$ ---------------------------------------- 57–66
$Al_2O_3$ --------------------------------------- 13.5–22
$Na_2O$ plus $Li_2O$ ---------------------------- 19.5–21.5
$Na_2O$ ---------------------------------------- 8–12
$Li_2O$ ---------------------------------------- 10–13 and $SiO_2$ ---------------------------------------- 60.5–63
$Al_2O_3$ --------------------------------------- 15.5–17
$Na_2O$ plus $Li_2O$ ---------------------------- 21.5–23.5
$Na_2O$ ---------------------------------------- 8–10.5
$Li_2O$ ---------------------------------------- 11.5–13

By the choice of the starting glass within these regions, the addition of silver ions to the bath containing lithium ions results in the formation of a surface layer consisting of two crystalline partial layers. The outermost layer contains as a crystalline phase, $\beta$-eucryptite ($Li_2O.Al_2O_3.2SiO_3$) and the layer located below it contains lithium metasilicate ($Li_2O.SiO_2$). Upon treating glass within the above ranges of composition for, for example, 1 hour at 700° C., the $\beta$-eucryptite layer which has a small negative coefficient of expansion, has a thickness of approximately 100 microns and the underlying layer of lithiummetasilicate which has a coefficient of expansion of approximately $120\times10^{17}/°$ C. has a thickness of approximately 800 microns. The coefficient of expansion of the said glasses likewise is approximately $120\times10^{17}/°$ C.

By this method and opaque surface is obtained.

The invention now provides another likewise very narrow limited range of compositions of glasses which, by the same treatment with a salt bath containing lithium ions, and also containing a small quantity of silver ions, can be converted, in contrast with the above mentioned glasses, into transparent products with strengths of from mentioned glasses, into transparent products with strengths of from 40–60 kgms./sq.mm. after standard damage with rotating emery paper.

The method according to the invention is characterized in that articles consisting of glass having a composition in percent by weight within the range of compositions limited as follows:

$SiO_2$: 55.5–59
$Al_2O_3$: 20.5–28
$Na_2O$: 11–15 
$Li_2O$: 5–7 } together 16–21 are subjected to such a known treatment above the annealing point but below the softening point of the glass in a bath containing lithium salt to which bath, however, a small quantity, approximately 0.01 gm. ion of silver ions, is added.

The invention will now be described in greater detail in the following example.

Mixtures of lithium carbonate, anhydrous sodium carbonate, aluminum oxide and quartz sand, in "proanalysis" quality in a mutual ration to obtain glasses of the compositions stated in table A were melted and rods were drawn from it.

These rods were then kept immersed for 1 hour in a melted salt bath heated at 660°–700° C. which consisted for 55% by weight of $Li_2SO_4$ and for 45% by weight of $Na_2SO_4$ and to which 2 gms. of $AgNO_3$ per kgm. were added. After completing the treatment the rods were cooled in air to room temperature and rinsed with tap water. After contact with rotating emery paper, the rods obtained the strength values ($\sigma_b$) stated in table A. They were not colored; if during the preparation of the starting glasses, less pure raw materials were used, the rods obtained a light color after the ion exchange treatment.

TABLE A

| Number | Composition (percent by weight) | | | | $\sigma_b$, (kg./mm.$^2$) |
|---|---|---|---|---|---|
| | $SiO_2$ | $Al_2O_3$ | $Li_2O$ | $Na_2O$ | |
| 1 | 58.3 | 21.4 | 6.3 | 14.0 | 55 |
| 2 | 57.2 | 24.3 | 5.7 | 12.8 | 60 |
| 3 | 56.2 | 27.1 | 5.1 | 11.6 | 40 |

In order to demonstrate how critical the composition of the glass is, three glasses lying just outside the range of compositions according to the invention of which rods spontaneously cracked in a treatment lasting 45 minutes in the above-mentioned salt melt, are stated below (table B). When the load duration was shortened, substantially no strengthening was reached.

TABLE B

| Number | Composition (percent by weight) | | | | $\sigma_b$, (kg./mm.$^2$) |
|---|---|---|---|---|---|
| | $SiO_2$ | $Al_2O_3$ | $Li_2O$ | $Na_2O$ | |
| 4 | 54.6 | 27.2 | 5.6 | 12.6 | |
| 5 | 55.2 | 29.7 | 4.6 | 10.5 | |
| 6 | 52.0 | 30.0 | 5.5 | 12.5 | |

What is claimed is:

1. A method of strengthening an article of glass consisting essentially of about 55.5–59% by weight of $SiO_2$, 20.5–28% by weight of $Al_2O_3$, 11–15% by weight of $Na_2O_3$, and 5–7% by weight of $Li_2O$, the total percent by weight of $Na_2O$ and $Li_2O$ being 6–21% comprising the steps of heating the glass to a temperature between the annealing point and softening point thereof, and contacting the glass while at said temperature with a melt containing lithium ions and silver ions with said silver ions being present in an amount between approximately 0.005 and 0.1 gram-ion per bath.

2. A method as claimed in claim 1 in which the quantity of silver ions is 0.01 gram-ion.

UNITED STATES PATENT OFFICE
CERTIFICATE OF CORRECTION

Patent No. 3,615,323      Dated October 26, 1971

Inventor(s) JOHANNES CORNELISSEN and ARNOLDUS MARTINUS MARIE DE RIJ]

It is certified that error appears in the above-identified patent and that said Letters Patent are hereby corrected as shown below:

Column 1, line 26 "4-50" should be --40-50--;

line 32, "$Li_2O.Al_2bh3.4\ SiO_2$" should be --$Li_2O.Al_2O_34SiO_2$-- line 42, "$Li_2O/Na_2O_3-Al_2O_{Al}-SiO_2$" should be --$Li_2O/Na_2O-Al_2O_3-SiO_2$--.

line 75, "$120 \times 10^{17}/°C$" should be --$120 \times 10^{-7}/°C$--

Column 2, line 2, "$120 \times 10^{17}/°C$" should be --$120 \times 10^{-7}/°C$--.

Signed and sealed this 27th day of June 1972.

(SEAL)
Attest:

EDWARD M. FLETCHER, JR.
Attesting Officer

ROBERT GOTTSCHALK
Commissioner of Patents